United States Patent [19]

Grabel

[11] Patent Number: 4,633,561

[45] Date of Patent: Jan. 6, 1987

[54] STUCK CASE REMOVER

[76] Inventor: Ramon Grabel, 6337 Egypt Valley Rd., Rockford, Mich. 49341

[21] Appl. No.: 790,421

[22] Filed: Oct. 23, 1985

[51] Int. Cl.[4] .......... B23P 11/02

[52] U.S. Cl. .......... 29/263

[58] Field of Search .......... 29/256, 263, 264; 411/378, 382, 381, 395

[56] References Cited

U.S. PATENT DOCUMENTS

| | | | |
|---|---|---|---|
| 1,504,771 | 8/1924 | Mallory . | |
| 1,631,889 | 6/1927 | Rappley | 29/256 |
| 1,709,328 | 4/1929 | Stover . | |
| 2,016,676 | 10/1935 | Hess . | |
| 3,841,193 | 10/1974 | Ito | 411/395 |
| 3,858,300 | 1/1975 | Borel | 29/256 |

FOREIGN PATENT DOCUMENTS

| | | | |
|---|---|---|---|
| 1395012 | 3/1965 | France | 411/378 |

*Primary Examiner*—Robert C. Watson
*Attorney, Agent, or Firm*—Varnum, Riddering, Schmidt & Howlett

[57] ABSTRACT

A case remover (10) is used for dislodging a bullet case (12) lodged within a sizing die (14). The case (12) includes a neck (20), a shoulder (22) depending rearwardly from the neck (20) and a bottom wall (34). The die (14) includes a die body (48) having a second bore (58) extending through the longitudinal axis of the die body (48). A sizing rod (52) engages the second bore (58) and has lock and depth nuts (54, 56) threadably engaging the upper part (68) of the sizing rod (52) and a sizer (72) rigidly secured to the bottom part (70) of the sizing rod (52). The second bore (58) includes a lower wall (62). The case remover (10) includes a bolt (80) having a third bore (90) extending through the longitudinal axis of the bolt (80), a nut (82) threadably engaging the bolt (80) and a knock-out pin (84). To dislodge the case (12) lodged within the die (14), the bolt (80) and the nut (82) are set in engagement with the sizing rod (52) through the third bore (90) of the bolt (80) and are positioned between the body (48) and the lock and depth nuts (54, 56). While the nut (82) is held stationary, the bolt (80) is threaded out of engagement with the nut (82) such that upward movement of the bolt (80) exerts an upward force on the lock and depth nuts (54, 56) to thereby move the sizing rod (52) upwardly to force the sizer (72) through the neck (20). To remove the case (12) from the second bore (58), the knock-out pin (84) is inserted into the second bore (58) and is forced against the bottom wall (34) to dislodge the case (12) from the wall (62) of the second bore (58).

7 Claims, 6 Drawing Figures

STUCK CASE REMOVER

FIELD OF THE INVENTION

This invention relates to an apparatus removing a bullet case stuck within a sizing die and, more particularly, to an appartus for dislodging a sizer of the sizing die from the shoulder and neck of the case and disengaging the case from an inner wall of the sizing die.

BACKGROUND OF THE INVENTION

Due to the relatively high cost of ammunition, many gun owners prefer reloading their own bullet cases rather than purchasing new bullets. When a bullet is fired, the explosion in the case causes the case to expand, especially the neck of the case. To be reused, the case neck must be shrunken to the proper size so that a new projectile can be snugly fit within the case neck.

Reloading requires the use of a press and a sizing die, the press and the die being used to resize the neck of the case. The conventional press includes a stationary die holder and a case holder positioned under the die holder and movable with respect to the same when a press handle is actuated. The sizing die is securely mounted to the die holder of the press and includes a die body having a bore running through the longitudinal axis thereof, a collar threadably engaging the die body and for adjusting the position of the die, a depth nut threadably engaging the die body and a sizing rod. The depth nut includes a threaded hole extending through the longitudinal axis thereof. The sizing rod is an elongated member threaded on the upper portion thereof and having a primer pin and a sizer on the lower portion thereof. The rod threadably engages the depth nut and is positioned within the bore of the die body. In this manner, the depth nut functions to adjust the depth of the sizing rod in the die body. In addition, a lock nut is threaded onto the top of the sizing rod to prevent rotation of the depth nut.

To resize the case neck, the case is positioned in the case holder of the press, with the case holder securely engaging an inwardly directed flange of the case located at the rear portion thereof. The press handle is then actuated to move the case up and into the sizing die. As the case moves into the sizing die, the primer pin and the sizer slide through the neck of the case and into the body of the same. Further extension of the case into the die causes the primer pin to "knock out" a fired primer pack located at the rear portion of the case and the inside wall of the die body to engage the outer portion of the case neck to thereby squeeze or shrink the same to a slightly over-shrunken size. The press handle is then reactuated to bring the case down and out of the sizing die. After overshrinking, the circumference of the neck is slightly less than that of the sizer. Thus, as the case is brought out of the die, the sizer passes through the neck to expand the same to the proper size. The case is then ready to be reloaded with new primer, new powder and a new projectile.

A common occurrence in reloading is severe overshrinking of the case neck during resizing of the same. When this occurs, as the case is brought out of the die body, the sizer becomes stuck on the shoulder of the case. Thus, as the case holder of the press moves downwardly, the flange of the case is stripped resulting in the case becoming stuck within the sizing die. Since the flange has been stripped, there is nothing for the case holder to grip onto to have the necessary leverage to remove the case. Furthermore, manual pulling, for example with a pair of pliers, on the top porition of the sizing rod will not work to pull the sizer up through the neck of the case for want of the necessary leverage.

To remove the case from the sizing die, known types of stuck case removers have been employed. Utilization of these devices, however, is tedious, time consuming and may result in damage to the sizing die. One type of known device includes a hollow cylindrical body having an open bottom axial end and an apertured top axial end, a screw and a wrench. In addition, the stuck case remover must be used in conjunction with a vise, a drill, a threading tap and a saw. To remove a case stuck in a sizing die, the user must first remove the depth and lock nuts from the sizing rod of the die. The sizing rod must then be pulled upwardly until the sizer engages the inside wall of the shoulder of the case. The die is then disassembled from the press and subsequently positioned upside down in a vise and held firmly between the clamping jaws of the vise. Next, a hole must be drilled directly through the rear axial end of the case. This step almost always results in damage to the primer pin positioned within the interior of the case in that when the hole is drilled through the rear end of the case the drill bit advances downwardly and strikes the primer pin. The tap is then used to thread the hole. Subsequently, the hollow body is placed over the rear end of the case and the screw is placed through the aperture in the body and threaded, by use of the wrench, into the hole in the case. By the action of the wrench, the case is then pulled out about one-half inch from the die body. The saw is then used to cut the case into two pieces at the rear portion of the case. Finally, the sizing rod, along with the sizer and primer pin, is pulled out of the sizing die through the rear axial end of the case. The die is then ready to resize another case after the die is reassembled and repositioned within the press.

SUMMARY OF THE INVENTION

A device is adapted to dislodge a bullet case lodged within a sizing die. The case includes a shoulder, a neck and a bottom wall, the shoulder, the neck and the bottom wall defining an interior. The sizing die comprises a body including a first axial end, a second axial end, a bore extending longitudinally through the body and having a wall, a sizing rod engaging the bore and a sizer rigidly secured to the sizing rod. The die also includes a first nut engaging the sizing rod. The device is adapted for use when the sizer is lodged within the interior of the case and is prevented from passing through the neck due to interference with the shoulder, and when the case engages the wall of the bore of the die body.

The device comprises a base adapted to engage the body of the die and a force-transferring means removably engaging the base, engaging the sizing rod and responsive to applied rotational forces for exerting linear forces on the sizing rod along the longitudinal axis of the sizing rod so as to force the sizer through the shoulder and the neck.

In one embodiment, the base comprises a second nut having a threaded aperture and adapted to receive the sizing rod through the aperture between the first axial end of the body and the first nut. The force-transferring means comprises a bolt having a head, a threaded shaft and a hole extending through the head and the shaft, and adapted to receive the sizing rod through the hole, threadably engage the second nut through the threaded aperture and be positioned between the first nut and the second nut. In this manner, the device is adapted to dislodge the sizer from the interior and force the sizer through the shoulder and the neck when the second nut is held stationary with respect to the body and rotational force is applied to the bolt. In addition, the device includes a washer having an opening and adapted to receive the sizing rod through the opening between the bolt and the first nut to prevent damage to the first nut when linear forces are exerted on the first nut by the bolt.

In another embodiment, the second nut and the bolt are adapted to connect to the sizing die in reverse positions from that described above. Thus, the bolt is adapted to receive the sizing rod through the hole between the first axial end of the body and the first nut, and the second nut is adapted to engage the threaded shaft of the bolt and receive the sizing rod through the aperture. In this manner, the device is adapted to dislodge the sizer from the interior and force the sizer through the shoulder and the neck when the bolt is held stationary with respect to the body and rotational force is applied to the nut. In this latter embodiment, the washer is adapted to receive the sizing rod through the opening between the second nut and the first nut to prevent damage to the first nut when linear forces are exerted on the first nut by the second nut.

In either embodiment, the device further comprises a bar adapted to disengage the case from the wall and remove the case from the bore, through the second axial end of the body, when positioned in engagement with the bore, through the first axial end of the body, and the interior of the case and forced against the bottom wall.

BRIEF DESCRIPTION OF THE DRAWINGS

The invention will now be described with reference to the drawings in which.

DESCRIPTION OF THE PREFERRED EMBODIMENTS

Figure 1:
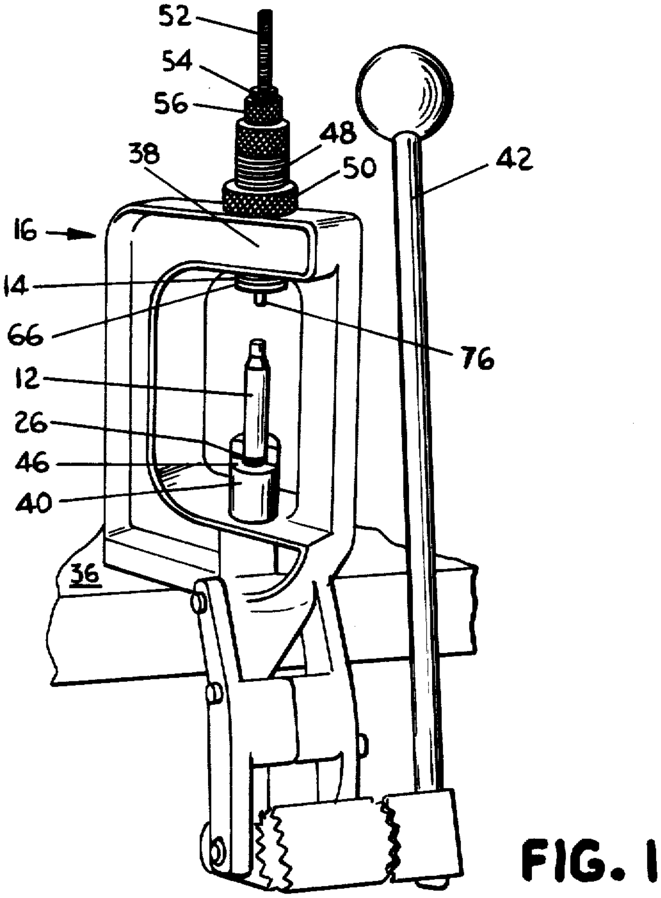
FIG. 1 is a front perspective view of a reloading press removably mounting a sizing die and a bullet case.

Referring to the drawings, there is shown a stuck case remover 10 for quickly and easily dislodging a bullet case 12 lodged in a sizing die 14 removably mounted to a press 16.

Figure 2:
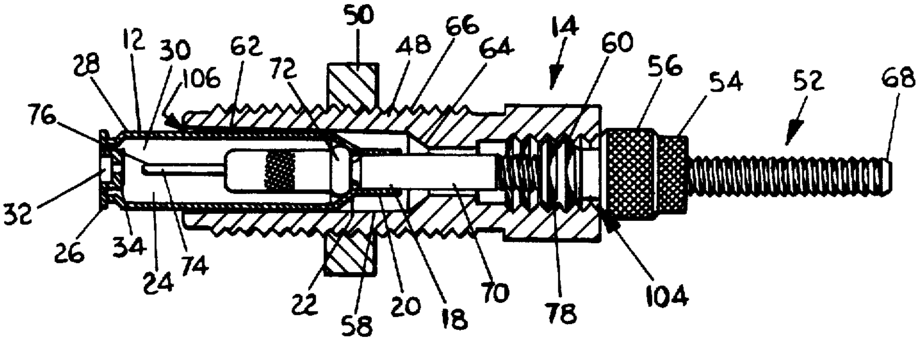
FIG. 2 is a cross-sectional view of a bullet case lodged within the sizing die.
Figure 3:
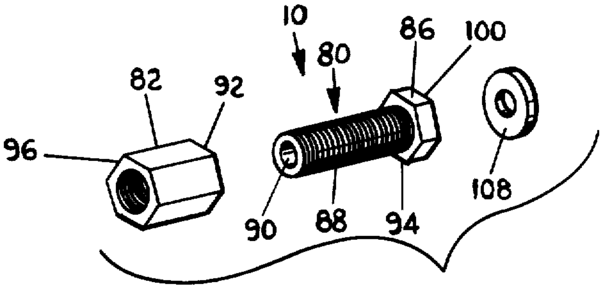
FIG. 3 is an exploded perspective view of a bolt, a nut and a washer in accordance with the invention.
Figure 4:
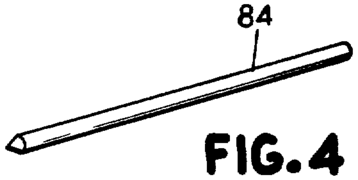
FIG. 4 is a front perspective view of a knock-out pin in accordance with the invention.
Figure 5:
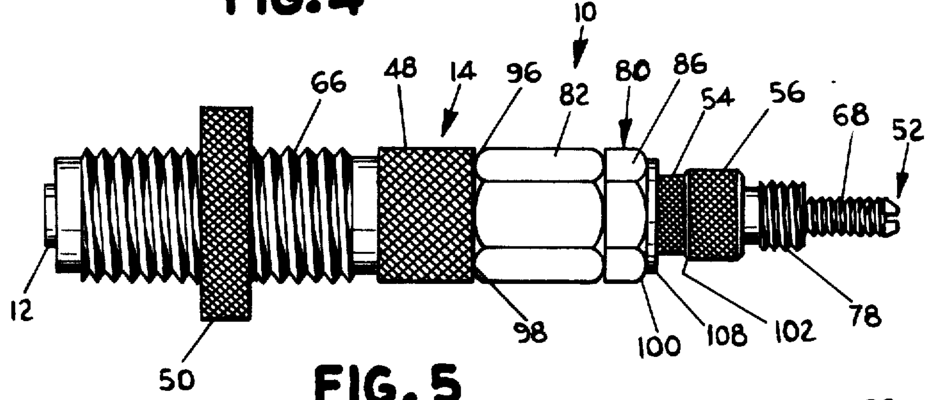
FIG. 5 is a plan view of a case remover in accordance with the invention removably mounted to the sizing die.

As shown in FIGS. 2 and 5, the bullet case 12 comprises at the front portion 18 thereof a neck 20 and a shoulder 22 depending rearwardly from the neck. A body 24 extends rearwardly from the shoulder 22, and a flange 26 circumscribes the case 12 at a rear portion 28 thereof. The neck 20, shoulder 22 and body 24 of the case 12 form and enclose an interior 30 of the case. In addition, the case 12 includes, a cavity 32 extending rearwardly from the rear portion 28, and an inner wall 34 separating the cavity from the interior 30 of the case.

As shown in FIG. 1, the press 16 is removably mounted to a work surface 36 and includes a stationary die holder 38 and a case holder 40 positioned underneath the die holder. The case holder 40 is vertically movable with respect to the die holder 38 when a press handle 42 is actuated. The die holder 38 has extending therethrough a threaded first bore (not shown) for threadably receiving the die 14. The case holder 40 includes a clamp 46 for securely engaging the flange 26 of the case 12 in such a manner that the longitudinal axis of the case is centered directly below the sizing die 14.

As illustrated in detail in FIG. 2, the sizing die 14 is removably secured and adjustably mounted to the die holder 38 of the press 16 and comprises a die body 48, a collar 50, a sizing rod 52, a lock nut 54 and a depth nut 56. The die body 48 is a substantially cylindrical member comprising a second bore 58 extending through the longitudinal axis of the die body and having a threaded upper wall 60 and an unthreaded lower wall 62 having a narrow upper area 64 near the threaded upper wall. The die body 48 also has a threaded lower surface 66 threadably engaging the first bore (not shown) of the die holder 38 of the press 16. The collar 50 also threadably engages the lower surface 66 of the die holder 14 and is adapted to engage the die holder 38 to adjustably secure the die in a desired position relative to the holder. The sizing rod 52 engages the second bore 58 of the die body 48 and includes a threaded upper part 68, a sizer 72 at a part 70 of the rod 52 and a primer pin 76 at a bottom terminal end 74 of the rod 52. The depth nut 56 threadably engages the upper part 68 of the sizing rod 52 and has a threaded lower outer surface 78 that threadably engages the second bore 58 at the threaded upper wall 60 thereof. In this manner, the depth nut 56 functions to adjust the depth of the sizing rod 52 in the die body 14. The lock nut 54 is threaded onto the upper part 68 of the sizing rod 52, above the depth nut 56, to prevent rotational movement of the sizing rod relative to the depth nut and thus to lock the sizing rod in the desired adjusted position relative to the die body 48.

In normal operation, the case 12 is resized by actuating the press handle 42, such actuation disposing the case up and into the second bore 58 of the die body 48 so that the sizing rod 52 engages the case neck 20 and the interior 30 of the case. The case neck 20 engages the narrow upper area 64 of the second bore so as to shrink the case neck to a slightly overshrunken size. Reactuation of the press handle 42 withdraws the case 12 from engagement with the die body 48, thereby withdrawing the sizer 72 out of engagement with the case neck 20 to stretch the same to the diameter necessary to snugly receive a new projectile (not shown).

Occasionally, however, overactuation of the press handle 42, that is the exertion of relatively large forces on the press handle by the user, causes the case neck 20 to engage the narrow upper area 64 of the lower wall 62 of the second bore 58 with relatively great force, resulting in severe overshrinking of the case neck. Thus, upon reactuation of the press handle 42, as the case holder 40 moves downwardly to move the case neck 20 out of engagement with the lower wall 62 of the second bore 58, the sizer 72 can become stuck on the case shoulder 22. The flange 26 of the case 12 can then be stripped, due to forces exerted on the flange by the clamp 46 of the case holder 40, resulting in the case being stuck or lodged within the sizing die 14.

This problem may be compounded by an additional factor. On occasion, when a bullet is fired, the case body 24 overly expands due to numerous causes, such as an excessive amount of gun powder (not shown) or an oversize gun chamber (not shown). Accordingly, when the press handle 42 is actuated and the overly expanded case 12 engages the second bore 58 of the die body 48, the case body 24 becomes lodged within the second bore 58 and against the lower wall 60 thereof. Since the case body 24 is positioned in the second bore 58 with a tight drive fit, additional forces are exerted on the flange 26 by the clamp 46 upon reactuation of the press handle 42.

Figure 6:
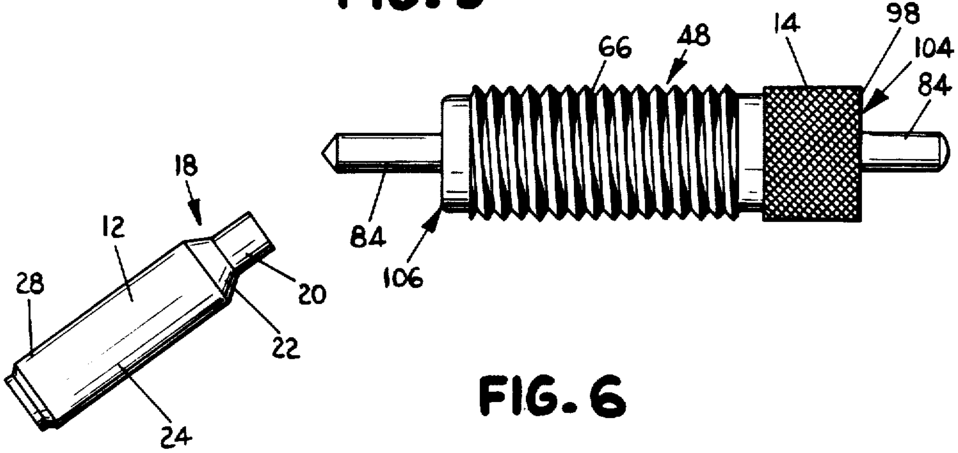
FIG. 6 is a plan view of the knock-out pin removably engaging the sizing die.

As shown in FIGS. 5 and 6, the stuck case 12 is removed from the die 14 through the use of the stuck case remover 10. The stuck case remover 10 comprises a bolt 80, a nut 82 and a knock-out pin 84. The bolt 80 includes a head 86, a threaded shaft 88 and a third bore 90 extending through the head and the shaft. The nut 82 is adapted to threadably engage the shaft 88 of the bolt 80.

To free the sizer 72 from engagement with the shoulder 22 of the case 12 and remove the same from the second bore 58 of the die 14, the lock nut 54 and the depth nut 56 are first removed from threaded engagement with the upper part 68 of the sizing rod 52. With the nut 82 fully threaded onto the shaft 88 of the bolt 80 so that an upper axial end 92 of the nut engages the bottom side 94 of the head 86 of the bolt, the bolt 80 is set in registry with the upper part 68 of the sizing rod 52, through the third bore 90 of the bolt. A lower axial end 96 of the nut 82 is thus in engagement with an upper axial edge 98 of the die body 48. Subsequently, the lock and depth nuts (54, 56) are rethreaded onto the sizing rod 52, but in the reverse order, with the lock nut 54 engaging a top side 100 of the head 86 of the bolt 80 and an upper axial side 102 of the depth nut 56 engaging the lock nut 54. While the nut 82 is held stationary, with for example a wrench (not shown), the bolt 80 is threaded, through rotational force exerted thereon by another wrench (not shown), out of engagement with the nut such that upward movement of the bolt exerts an upward force on the lock and depth nuts to thereby force the sizing rod 52 upwardly. Reversing the order of the lock and depth nuts (54, 56) prevents rotation of the sizing rod 52 with respect to the lock and depth nuts when the bolt 80 is rotated out of engagement with the nut. As the sizing rod 52 is moved upwardly out of the die 14, the case shoulder 22 engages the narrow area 64 of the lower wall 62 of the second bore 50 to hold the case 12 stationary relative to the die 14 to allow the sizer 72 to be forced through the case shoulder 22 and neck 20. The sizing rod 52 may then be fully removed from the second bore 58 through an upper portion 104 thereof.

At this time, although the sizer 72 is no longer stuck within the interior 30 of the case 12, the case is stuck on the narrow area 64 of the lower wall 62 of the second bore 58 of the die body 48. To remove the case 12 from the second bore 58, through a lower portion 106 thereof, the knock-out pin 84 is inserted into the upper portion 104 of the second bore and is tapped against the inner wall 34 of the case 12 to dislodge the case from the lower wall 62 of the second bore. The die 14 is then reassembled to resize another case.

As can be seen from the foregoing disclosure, the present invention can be utilized to remove a case 12 stuck within the body 48 of the sizing die 14 without detachment of the die from the die holder 38 of the press 16. Further, utilization of the present invention does not result in damage to any part of the sizing die (14).

In the preferred embodiment, a washer 108 is slidably set in registry with the upper part 68 of the sizing rod 52 and positioned between the head 86 of the bolt 80 and the depth nut 56. The washer 108 prevents chafing of the upper axial side 102 of the depth nut 56. That is, when the bolt 80 is rotated relative to the nut 82, the washer 108 remains stationary relative to the depth nut 56 while the bolt head 86 rotatably engages the washer. Although the bolt 80, along with the nut 82 threadably engaging the same, is preferably slidably fit over the sizing rod 52 with the bolt in overlying relationship to the nut, it is contemplated that the position of the bolt and the nut may be reversed. In this configuration, removal of the sizing rod 52 from the interior 30 of the case 12 is accomplished by holding the bolt 80 stationary and threadably disengaging the nut 82 upwardly therefrom to force the sizer 72 through the shoulder 22 and neck 20 of the case.

While the invention has been described in connection with the preferred embodiment, it will be understood that I do not intend to limit the invention to that embodiment. To the contrary, I intend to cover all alternatives, modifications and equivalents as may be included within the spirit and scope of the invention as defined by the appended claims.

The embodiments of the invention in which an exclusive property or privilege is claimed are defined as follows:

1. The combination of a sizing die and a device for dislodging a bullet case lodged within a sizing die;

said case having a shoulder and a neck, said shoulder and said neck defining an interior;

said sizing die having a body including a first axial end, a second axial end and a bore extending longitudinally through said body from said first axial end to said second axial end, a threaded sizing rod having an upper end and lower end and engaging said bore, a first nut threadably engaging said upper end, a lock nut threadably engaging said upper end, securely engaging said first nut and for preventing rotation of said sizing rod relative to said die body, and a sizer secured to said lower end of said sizing rod; and said device adapted for dislodging said case when said sizer is lodged within said interior of said case and is prevented from passing through said neck due to interference with said shoulder and comprising a base adapted to engage said body and a force-transferring means removably engaging said base, engaging said first nut and responsive to applied rotational forces for exerting linear forces on said sizing rod along the longitudinal axis of said sizing rod so as to force said sizer through said shoulder and said neck.

2. The combination according to claim 1, wherein said base comprises a second nut having a threaded aperture and adapted to receive said sizing rod through said aperture between said first axial end of said body and either one of said first nut or said lock nut; and said force-transferring means comprises a bolt having a head, a threaded shaft and a hole extending through said head and said shaft, adapted to receive said sizing rod through said hole, threadably engaging said second nut through said threaded aperture and positioned between either one of said first nut or said lock nut and said second nut;

whereby said device is adapted to dislodge said sizer from said interior and force said sizer through said shoulder and said neck when said second nut is held stationary with respect to said body and rotational force is applied to said bolt.

3. The combination according to claim 2, wherein said bore comprises a wall, said case further comprises a bottom wall and said device is further adapted for use when said case engages said wall of said bore; and said device further comprises a bar adapted to disengage said case from said wall and remove said case from said bore, through said second axial end, when positioned in engagement with said bore, through said first axial end, and said interior and force against said bottom wall.

4. The combination according to claim 3, wherein said device further comprises a washer having an opening and adapted to receive said sizing rod through said opening between said bolt and either one of said first nut or said lock nut to prevent damage to either one of said first nut or said lock nut when linear forces are exerted on either one of said first nut or said lock nut by said bolt.

5. The combination according to claim 1, wherein said base comprises a bolt having a head, a threaded shaft and a hole extending through said head and said shaft, and adapted to receive said sizing rod through said hole between said first axial end of said body and either one of said first nut or said lock nut; and said force-transferring means comprises a second nut having an aperture and adapted to engage said threaded shaft and receive said sizing rod through said aperture;

whereby said device is adapted to dislodge said sizer from said interior and force said sizer through said shoudler and said neck when said bolt is held stationary with respect to said body and rotational force is applied to said nut.

6. The combination according to claim 5, wherein said bore comprises a wall, said case further comprises a bottom wall and said device is further adapted for use when said case engages said wall of said bore; and said device further comprises a bar adapted to disengage said case from said wall and remove said case from engagement with said bore, through said second axial end, when positioned in engagement with said bore, through said first axial end, and said interior and forced against said bottom wall.

7. The combination according to claim 6, wherein said device further comprises a washer having an opening and adapted to receive said sizing rod through said opening between said second nut and either one of said first nut or said lock nut to prevent damage to either one of said first nut or said lock nut when linear forces are exerted on either one of said first nut or said lock nut by said second nut.

* * * * *

UNITED STATES PATENT AND TRADEMARK OFFICE

CERTIFICATE OF CORRECTION

PATENT NO. : 4,633,561

DATED : January 6, 1987

INVENTOR(S) : Ramon Grabel

It is certified that error appears in the above-identified patent and that said Letters Patent is hereby corrected as shown below:

The title page should be deleted to appear as per attached title page.

Signed and Sealed this

Twenty-first Day of June, 1988

Attest:

DONALD J. QUIGG

*Attesting Officer*

*Commissioner of Patents and Trademarks*

United States Patent [19] — Grabel

[11] Patent Number: 4,633,561

[45] Date of Patent: Jan. 6, 1987

[54] STUCK CASE REMOVER

[76] Inventor: Ramon Grabel, 6337 Egypt Valley Rd., Rockford, Mich. 49341

[21] Appl. No.: 790,421

[22] Filed: Oct. 23, 1985

[51] Int. Cl.[4] .......... B23P 11/02

[52] U.S. Cl. .......... 29/263

[58] Field of Search .......... 29/256, 263, 264; 411/378, 382, 381, 395

[56] References Cited

U.S. PATENT DOCUMENTS

| | | | |
|---|---|---|---|
| 1,504,771 | 8/1924 | Mallory . | |
| 1,631,889 | 6/1927 | Rappley | 29/256 |
| 1,709,328 | 4/1929 | Stover . | |
| 2,016,676 | 10/1935 | Hess . | |
| 3,841,193 | 10/1974 | Ito | 411/395 |
| 3,858,300 | 1/1975 | Borel | 29/256 |

FOREIGN PATENT DOCUMENTS

| | | | |
|---|---|---|---|
| 1395012 | 3/1965 | France | 411/378 |

*Primary Examiner*—Robert C. Watson
*Attorney, Agent, or Firm*—Varnum, Riddering, Schmidt & Howlett

[57] ABSTRACT

A case remover (10) is used for dislodging a bullet case (12) lodged within a sizing die (14). The case (12) includes a neck (20), a shoulder (22) depending rearwardly from the neck (20) and a bottom wall (34). The die (14) includes a die body (48) having a second bore (58) extending through the longitudinal axis of the die body (48). A sizing rod (52) engages the second bore (58) and has lock and depth nuts (54, 56) threadably engaging the upper part (68) of the sizing rod (52) and a sizer (72) rigidly secured to the bottom part (70) of the sizing rod (52). The second bore (58) includes a lower wall (62). The case remover (10) includes a bolt (80) having a third bore (90) extending through the longitudinal axis of the bolt (80), a nut (82) threadably engaging the bolt (80) and a knock-out pin (84). To dislodge the case (12) lodged within the die (14), the bolt (80) and the nut (82) are set in engagement with the sizing rod (52) through the third bore (90) of the bolt (80) and are positioned between the body (48) and the lock and depth nuts (54, 56). While the nut (82) is held stationary, the bolt (80) is threaded out of engagement with the nut (82) such that upward movement of the bolt (80) exerts an upward force on the lock and depth nuts (54, 56) to thereby move the sizing rod (52) upwardly to force the sizer (72) through the neck (20). To remove the case (12) from the second bore (58), the knock-out pin (84) is inserted into the second bore (58) and is forced against the bottom wall (34) to dislodge the case (12) from the wall (62) of the second bore (58).

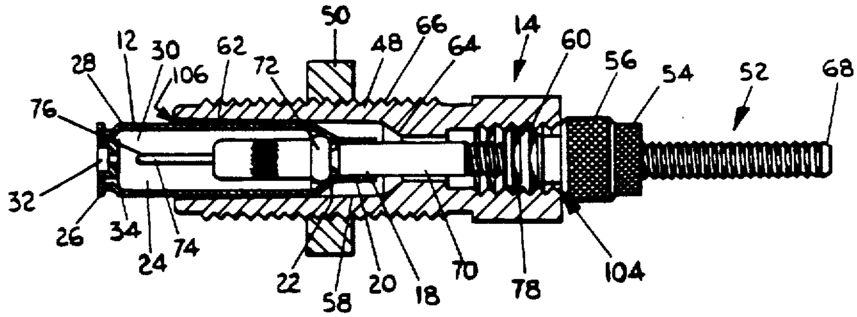

7 Claims, 6 Drawing Figures